United States Patent
Ko et al.

(10) Patent No.: US 11,840,119 B2
(45) Date of Patent: Dec. 12, 2023

(54) MOVABLE OBJECT WITH ATTITUDE CONTROL

(71) Applicants: Hyundai Motor Company, Seoul (KR); Kia Motors Corporation, Seoul (KR)

(72) Inventors: Hun Keon Ko, Gyeonggi-do (KR); Geun Sang Yu, Chungcheongnam-do (KR); Joo Young Chun, Seoul (KR); Eun Ho Seo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 542 days.

(21) Appl. No.: 16/951,763

(22) Filed: Nov. 18, 2020

(65) Prior Publication Data

US 2021/0387499 A1 Dec. 16, 2021

(30) Foreign Application Priority Data

Jun. 11, 2020 (KR) .......................... 10-2020-0071088

(51) Int. Cl.
| | |
|---|---|
| *B60G 17/016* | (2006.01) |
| *B62D 9/04* | (2006.01) |
| *B60K 17/356* | (2006.01) |
| *B60K 7/00* | (2006.01) |
| *B60G 17/0195* | (2006.01) |

(52) U.S. Cl.
CPC ....... *B60G 17/0195* (2013.01); *B60G 17/016* (2013.01); *B60K 7/0007* (2013.01); *B60K 17/356* (2013.01); *B62D 9/04* (2013.01); *B60G 2800/01* (2013.01)

(58) Field of Classification Search
CPC ................ B60K 7/0007; B60K 17/356; B60G 17/0195; B60G 17/016; B60G 1/00; B60G 2200/44; B60G 2200/46; B60G 2200/462; B60G 2300/50; B60G 2800/01; B25J 5/007; B25J 9/126; B25J 19/0008; B60B 35/003; B60B 35/1045
USPC ........................................................ 180/234
See application file for complete search history.

(56) References Cited

U.S. PATENT DOCUMENTS

2021/0061284 A1 3/2021 Ko et al.

FOREIGN PATENT DOCUMENTS

| CN | 110733058 A | * | 1/2020 |
|---|---|---|---|
| KR | 20210026249 A | | 3/2021 |

* cited by examiner

*Primary Examiner* — Kevin Hurley
*Assistant Examiner* — Felicia L. Brittman
(74) *Attorney, Agent, or Firm* — Fox Rothschild LLP (57) ABSTRACT

A movable object such as a mobile robot is designed to be driven indoors or outdoors with improved stability. Stability is enhanced by an attitude control mechanism to improve attitude stability of the movable object in a direction perpendicular to a driving direction thereof. The movable object includes an attitude control motor including a connecting shaft having a first end connected to a body part and a second end connected to a wheel, wherein the second end of the connecting shaft is located higher or lower than the first end of the connecting shaft.

18 Claims, 7 Drawing Sheets

MOVABLE OBJECT WITH ATTITUDE CONTROL

CROSS-REFERENCE TO RELATED APPLICATION

This application claims under 35 U.S.C. § 119(a) the benefit of Korean Patent Application No. 10-2020-0071088, filed on Jun. 11, 2020 in the Korean Intellectual Property Office, the entire contents of which are incorporated by reference herein.

BACKGROUND (a) Technical Field

The present disclosure relates to a movable object, more particularly, to the movable object that includes an attitude control mechanism to improve stability and allow the movable object to rotate freely while moving.

(b) Description of the Related Art

In accordance with the trend of unmanned robots designed to handle existing human tasks, there is an increasing demand for mobile robots capable of carrying goods indoors or outdoors. Accordingly, research has been conducted on robots capable of performing such functions.

Meanwhile, when a mobile robot is driven on an uneven floor or uneven ground indoors or outdoors, the mobile robot may overturn during a driving process. Thus, it is important to secure stability to prevent the robot carrying goods from overturning during the driving process. However, the mobile robot according to the related art has failed to secure sufficient stability during the driving process. In particular, according to the related art, there is less stability in a direction perpendicular to the driving direction of the robot.

SUMMARY

An aspect of the present disclosure provides a movable object (or mobile robot) which is designed to be driven indoors or outdoors with improved stability. In particular, attitude stability of the mobile robot in a direction perpendicular to a driving direction thereof may be improved.

According to an aspect of the present disclosure, a movable object may include: a body part forming a main body; at least one wheel provided on at least one of left or right sides of the body part; and an attitude control motor including a connecting shaft having a first end connected to the body part and a second end connected to the wheel, and extending from the first end toward the second end in a longitudinal direction thereof, wherein the attitude control motor further includes a driving force providing unit that provides a driving force to the connecting shaft to allow the wheel to be steered by a rotation of the connecting shaft, the connecting shaft and the wheel are fixedly connected, and the second end of the connecting shaft is located higher or lower than the first end of the connecting shaft.

The second end of the connecting shaft may be located in front of or behind the first end of the connecting shaft.

The wheel may include a front wheel provided on a front area of the body part, and the second end of the connecting shaft connected to the front wheel may be located in front of the first end of the connecting shaft.

The wheel may include a rear wheel provided on a rear area of the body part, and the second end of the connecting shaft connected to the rear wheel may be located behind the first end of the connecting shaft.

The second end of the connecting shaft may be located higher than the first end of the connecting shaft.

The attitude control motor may steer the wheel by driving the connecting shaft to rotate in a manner that allows a front portion of the wheel to move away from or close to the body part.

The attitude control motor may steer the wheel by driving the connecting shaft to rotate in a manner that allows an upper portion of the wheel to move away from or close to the body part.

The attitude control motor may steer the wheel by driving the connecting shaft to rotate in a manner that allows a front portion and an upper portion of the wheel to move away from or close to the body part.

The wheel may further include an in-wheel motor providing a rotational force to the wheel to allow the wheel to rotate.

The wheel may include a plurality of wheels, the in-wheel motor and the attitude control motor may be provided in each wheel so that a plurality of in-wheel motors and a plurality of attitude control motors may correspond to the plurality of wheels, respectively, and the plurality of in-wheel motors and the plurality of attitude control motors may be driven independently of each other.

The front wheel may include a right front wheel provided on the right side of the front area of the body part and a left front wheel provided on the left side of the front area of the body part, and the rear wheel may include a right rear wheel provided on the right side of the rear area of the body part and a left rear wheel provided on the left side of the rear area of the body part.

The attitude control motor may drive the connecting shaft to rotate in a manner that allows a front portion of the left front wheel to be steered away from the body part when a front portion of the right front wheel is steered close to the body part, and the attitude control motor may drive the connecting shaft to rotate in a manner that allows the front portion of the left front wheel to be steered close to the body part when the front portion of the right front wheel is steered away from the body part.

The attitude control motor may drive the connecting shaft to rotate in a manner that allows an upper portion of the left front wheel and an upper portion of the left rear wheel to be steered close to the body part when an upper portion of the right front wheel and an upper portion of the right rear wheel are steered close to the body part.

The attitude control motor may drive the connecting shaft to rotate in a manner that allows an upper portion of the left front wheel to be steered close to the body part and allows a front portion of the left front wheel to be steered close to the body part when an upper portion of the right front wheel is steered close to the body part and a front portion of the right front wheel is steered close to the body part.

The attitude control motor may drive the connecting shaft to rotate in a manner that allows an upper portion of the left rear wheel to be steered close to the body part and allows a front portion of the left rear wheel to be steered away from the body part when an upper portion of the right rear wheel is steered close to the body part and a front portion of the right rear wheel is steered away from the body part.

The in-wheel motor may drive the left front wheel and the left rear wheel to rotate in a reverse direction when the right front wheel and the right rear wheel rotate in a forward direction.

The in-wheel motor may drive the left front wheel and the right rear wheel to rotate in a reverse direction when the right front wheel and the left rear wheel rotate in a forward direction.

The in-wheel motor may drive the left front wheel and the right rear wheel to rotate in a forward direction when the right front wheel and the left rear wheel rotate in a reverse direction.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, the structure and operations of a movable object according to exemplary embodiments of the present disclosure will be described in detail with reference to the accompanying drawings.

Movable Object

Figure 1:
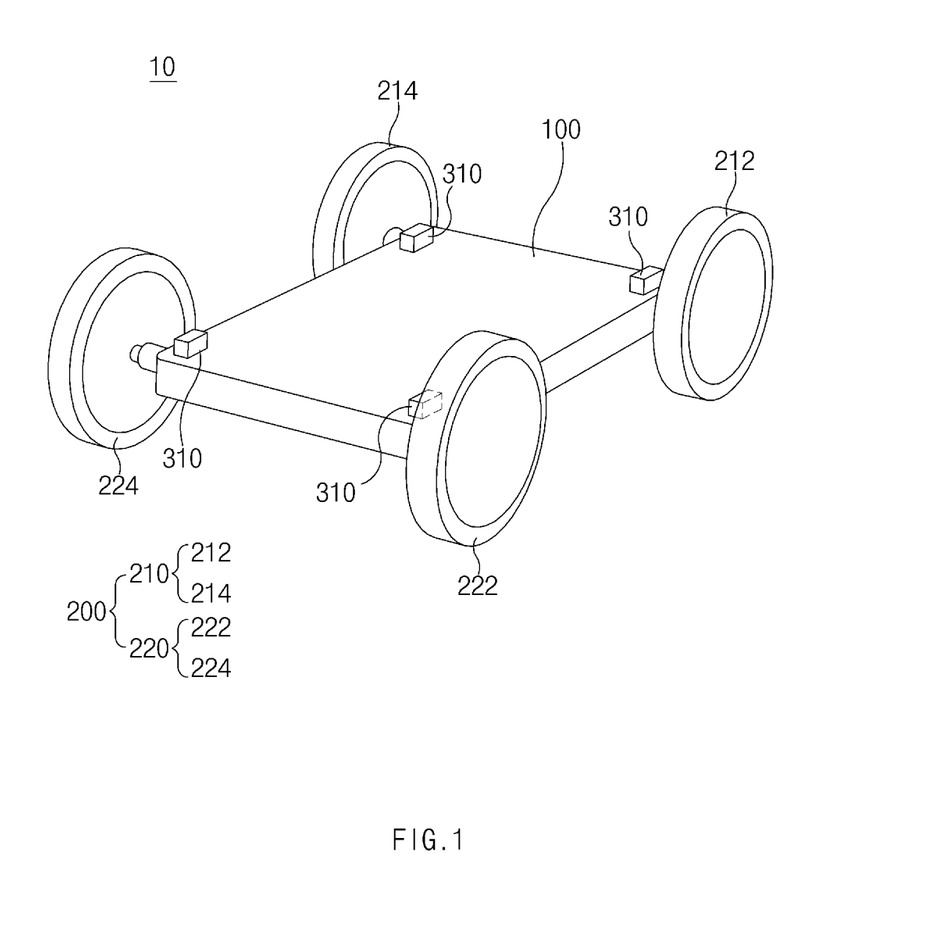
FIG. 1 is a perspective view illustrating a structure of a movable object according to an exemplary embodiment of the present disclosure.
Figure 2:
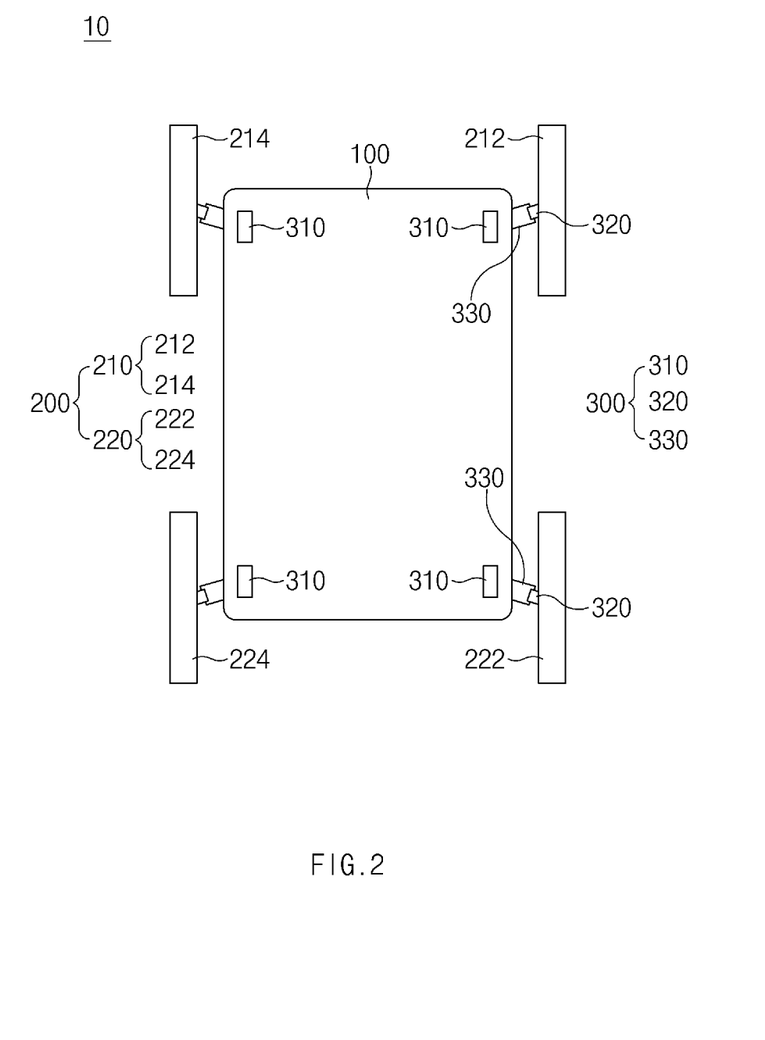
FIG. 2 is a plan view illustrating a structure of a movable object according to an exemplary embodiment of the present disclosure.
Figure 3:
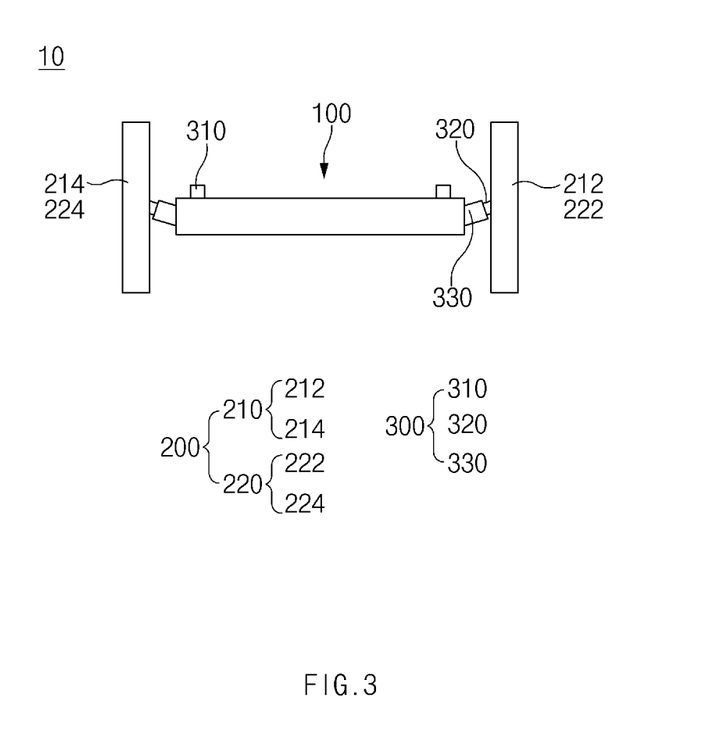
FIG. 3 is a side view illustrating a structure of a movable object according to an exemplary embodiment of the present disclosure.
Figure 4:
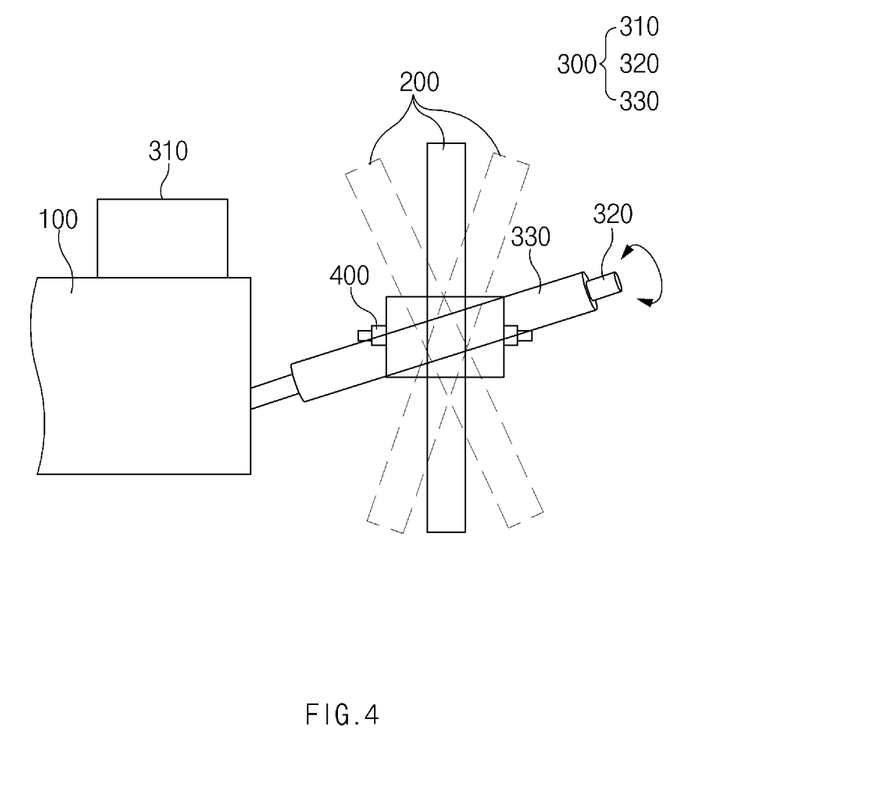
FIG. 4 is an enlarged side view illustrating a wheel, an attitude control motor, and an in-wheel motor in a movable object according to an exemplary embodiment of the present disclosure.

FIG. 1 is a perspective view illustrating a structure of a movable object according to an exemplary embodiment of the present disclosure, and FIG. 2 is a plan view illustrating a structure of a movable object according to an exemplary embodiment of the present disclosure. FIG. 3 is a side view illustrating a structure of a movable object according to an exemplary embodiment of the present disclosure, and FIG. 4 is an enlarged side view illustrating a wheel, an attitude control motor, and an in-wheel motor in a movable object according to an exemplary embodiment of the present disclosure.

A movable object 10 according to an exemplary embodiment of the present disclosure may be designed to carry equipment, goods, or cargo indoors or outdoors. For example, the movable object 10 may deliver goods outdoors.

As illustrated in FIGS. 1 to 4, the movable object 10 according to an exemplary embodiment of the present disclosure may include a body part 100 forming a main body of the movable object 10, and at least one wheel 200 provided on at least one of left or right sides of the body part 100. The movable object may be provided with the plurality of wheels 200. More preferably, the wheels 200 may be provided on both the left and right sides of the body part 100.

For example, the wheels 200 may include a front wheel 210 provided on a front area of the body part 100, and a rear wheel 220 provided on a rear area of the body part 100.

Referring to FIGS. 1 to 4, the front wheel 210 may include a right front wheel 212 provided on the right side of the front area of the body part 100, and a left front wheel 214 provided on the left side of the front area of the body part 100. In addition, the rear wheel 220 may include a right rear wheel 222 provided on the right side of the rear area of the body part 100, and a left rear wheel 224 provided on the left side of the rear area of the body part 100. FIGS. 1 to 3 illustrate the movable object 10 having four wheels according to an exemplary embodiment of the present disclosure, but the number of wheels of the movable object 10 according to exemplary embodiments of the present disclosure is not limited thereto.

As illustrated in FIG. 4, the wheel 200 may further include an in-wheel motor 400 providing a rotational force to the wheel 200 to allow the wheel 200 to rotate. The in-wheel motor 400 may be provided inside each wheel 200. Since there are the plurality of wheels 200 as mentioned above, the wheels 200 may also include the plurality of in-wheel motors 400 provided therein, respectively.

Meanwhile, referring to FIGS. 1 to 4, the movable object 10 may include an attitude control motor 300 including a connecting shaft 320 having a first end connected to the body part 100 and a second end connected to the wheel 200. More preferably, the connecting shaft 320 may extend in a direction from the first end thereof connected to the body part 100 toward the second end thereof connected to the wheel 200, which is referred to as a longitudinal direction.

The attitude control motor 300 may control a steering of the wheel 200. That is, the in-wheel motor 400 may provide the rotational force to allow the wheel 200 to rotate so that the movable object 10 may move, while the attitude control motor 300 may steer the wheel 200 by allowing the connecting shaft 320 to rotate so that the movable object 10 may move or rotate in specific directions, or may control the overall stability of the movable object 10 so that the movable object 10 may be prevented from overturning. To this end, the connecting shaft 320 may be fixedly connected to the wheel 200. Thus, the wheel 200 may not move and rotate relative to the connecting shaft 320 unless the in-wheel motor 400 causes the wheel 200 to rotate. For example, the connecting shaft 320 may be connected to a stator of the in-wheel motor 400 provided inside the wheel 200 by welding. Thus, when the connecting shaft 320 of the attitude control motor 300 rotates, the wheel 200 may be steered in accordance with the rotation of the connecting shaft 320. The steering of the wheel 200 in relation to the rotation of the connecting shaft 320 will be described below.

The attitude control motor 300 may further include a driving force providing unit 310 that provides a driving force to the connecting shaft 320 so that the wheel 200 may be steered. The driving force providing unit 310 may provide the driving force to the connecting shaft 320, and thus the wheel 200 may be steered in accordance with the rotation of the connecting shaft 320. In particular, the driving force provided by the driving force providing unit 310 may allow the connecting shaft 320 to rotate on a longitudinal axis of the connecting shaft 320, and the wheel 200 may be steered by the rotation of the connecting shaft 320.

Meanwhile, as described above, since there are the plurality of wheels 200 and the plurality of in-wheel motors 400, the movable object may be provided with the plurality of attitude control motors 300 for steering the plurality of wheels 200, respectively. Here, the plurality of in-wheel motors 400 and the plurality of attitude control motors 300 may correspond to the plurality of wheels 200 (e.g., in one-to-one correspondence), respectively. For example, as illustrated in FIGS. 1 to 4, when there are four wheels 200, four in-wheel motors 400 and four attitude control motors 300 may be provided. The in-wheel motors 400 may correspond to the wheels 200, respectively, and the attitude control motors 300 may also correspond to the wheels 200, respectively. According to exemplary embodiments of the present disclosure, the plurality of in-wheel motors 400 and the plurality of attitude control motors 300 may be driven independently of each other.

Meanwhile, referring to FIG. 4, the attitude control motor 300 may further include a housing 330 provided to cover the surface of the connecting shaft 320. The housing 330 may protect the connecting shaft 320 from the outside. For example, the housing 330 may be fixed to the connecting shaft 320.

Meanwhile, referring to FIG. 3, according to exemplary embodiments of the present disclosure, the connecting shaft 320 in the movable object 10 may be connected to the body part 100 and the wheel 200 in a state of being inclined at a predetermined angle with respect to the ground in the longitudinal direction of the connecting shaft 320. It can be seen that the second end of the connecting shaft 320 connected to the wheel 200 may be located higher or lower than the first end of the connecting shaft 320 connected to the body part 100. More preferably, as illustrated in FIGS. 3 and 4, the second end of the connecting shaft 320 may be located higher than the first end of the connecting shaft 320.

According to the related art, mobile robots with wheels have failed to secure sufficient stability in a driving process when they are driven on an uneven surface. In particular, there is less stability in a left-right direction perpendicular to the driving direction of the robot. In this case, the robot has frequently fallen down in the left-right direction and overturned during the driving process.

Increasing a left-right width of the mobile robot in order to improve the stability of the mobile robot in the left-right direction has been proposed, but the size of the mobile robot becomes larger than necessary, limiting an area in which the mobile robot is allowed to drive.

The movable object according to exemplary embodiments of the present disclosure has been proposed to solve the aforementioned problems in the related art. As described above, the connecting shaft 320 may be connected to the wheel 200 in the inclined state with respect to the ground in the longitudinal direction of the connecting shaft 320. As illustrated in FIG. 4, when the connecting shaft 320 rotates, the wheel 200 inclined with respect to the connecting shaft 320 at the predetermined angle may rotate in a state of being fixed to the connecting shaft 320, and accordingly the wheel 200 may be steered as an angle of the wheel 200 to the ground changes over time. In particular, when the wheel 200 rotates and the connecting shaft 320 also rotates, the wheel 200 may be said to be precessing (precessional motion) in a manner that changes a rotation axis of the wheel 200 over time.

With reference to the above descriptions and FIGS. 1 to 4, the attitude control motor 300 may provide the driving force to the connecting shaft 320 to cause the connecting shaft 320 to rotate and steer the wheel 200 so that an upper portion of the wheel 200 may move away from or close to the body part 100. It may also be said that the attitude control motor 300 may provide the driving force to the connecting shaft 320 so that a lower portion of the wheel 200 may move away from or close to the body part 100.

Due to the aforementioned characteristic, when the movable object 10 is less likely to overturn in the left-right direction since the movable object 10 is driven on the even ground, it may control the wheel 200 in a manner that keeps the wheel 200 upright to the ground again by the rotation of the connecting shaft 320 of the attitude control motor 300. Thus, in spite of the characteristic in which the second end of the connecting shaft 320 is located higher than the first end of the connecting shaft 320, the driving performance of the movable object 10 on the even ground may not be reduced compared to the related art.

Meanwhile, referring to FIG. 2, the connecting shaft 320 in the movable object 10 according to exemplary embodiments of the present disclosure may be connected to the body part 100 and the wheel 200 in a state of being inclined vertically and horizontally. It can be seen that the second end of the connecting shaft 320 connected to the wheel 200 may be located in front of or behind the first end of the connecting shaft 320 connected to the body part 100. More preferably, the connecting shaft 320 connected to the front wheel 210 and the connecting shaft 320 connected to the rear wheel 220 may be inclined in different directions.

That is, as illustrated in FIG. 2, the second end of the connecting shaft 320 connected to the front wheel 210 may be located in front of the first end thereof. On the contrary, as illustrated in FIG. 2, the second end of the connecting shaft 320 connected to the rear wheel 220 may be located behind the first end thereof.

To be described below, in order for the movable object 10 to rotate in place or move straight in the left-right direction, the steering of the wheel may be controlled in a manner that allows a front portion of the front wheel 210 to move close to the body part 100, and allows a rear portion of the rear wheel 220 to move close to the body part 100. Various movements of the movable object 10 according to exemplary embodiments of the present disclosure will be detailed below.

Referring to FIGS. 1 to 4, the attitude control motor 300 may steer the wheel 200 by driving the connecting shaft 320 to rotate in a manner that allows the front portion of the wheel 200 to move far away from or close to the body part 100. In addition, the attitude control motor 300 may drive the connecting shaft 320 to rotate in a manner that allows the rear portion of the wheel 200 to move far away from or close to the body part 100.

More preferably, the attitude control motor 300 may steer the wheel 200 by driving the connecting shaft 320 to rotate in a manner that allows the front portion and the upper portion of the wheel 200 to move far away from or close to the body part 100. That is, the attitude control motor 300 may provide the driving force to the connecting shaft 320 to cause connecting shaft 320 to rotate in a manner that (i) allows the front portion of the wheel to move close to the body part, while allowing the upper portion of the wheel to move close to the body part, (ii) allows the front portion of the wheel to move close to the body part, while allowing the upper portion of the wheel to move far away from the body part, (iii) allows the front portion of the wheel to move far away from the body part, while allowing the upper portion of the wheel to move close to the body part, and (iv) allows the front portion of the wheel to move far away from the body part, while allowing the upper portion of the wheel to move far away from the body part. As described above, the attitude control motor 300 may allow the connecting shaft 320 to rotate so that the wheel 200 may perform the precessional motion in a manner that changes the rotation axis of the wheel 200 in a state in which the wheel 200 is rotated by the in-wheel motor 400.

However, according to exemplary embodiments of the present disclosure, since the connecting shaft 320 is connected to the body part 100 and the wheel 200 in the inclined state, a steering angle of the wheel 200 to be steered or adjusted by the rotation of the connecting shaft 320 may be asymmetrical in horizontal and vertical directions.

That is, for example, since the second end of the connecting shaft 320 connected to the right front wheel 212 is located in front of and higher than the first end of the connecting shaft 320 connected to the body part 100, a steering angle of the right front wheel 212 when the upper portion of the right front wheel 212 is as close as possible to the body part 100 may be greater than a steering angle of the right front wheel 212 when the upper portion of the right front wheel 212 is as far away as possible from the body part 100, and a steering angle of the right front wheel 212 when the front portion of the right front wheel 212 is as close as possible to the body part 100 may be greater than a steering angle of the right front wheel 212 when the front portion of the right front wheel 212 is as far away as possible from the body part 100. This may also be applied to the left front wheel 214.

On the other hand, for example, since the second end of the connecting shaft 320 connected to the right rear wheel 222 is located behind and higher than the first end of the connecting shaft 320 connected to the body part 100, a steering angle of the right rear wheel 222 when the upper portion of the right rear wheel 222 is as close as possible to the body part 100 may be greater than a steering angle of the right rear wheel 222 when the upper portion of the right rear wheel 222 is as far away as possible from the body part 100, and a steering angle of the right rear wheel 222 when the rear portion of the right rear wheel 222 is as close as possible to the body part 100 may be greater than a steering angle of the right rear wheel 222 when the rear portion of the right rear wheel 222 is as far away as possible from the body part 100. This may also be applied to the left rear wheel 224.

Figure 5:
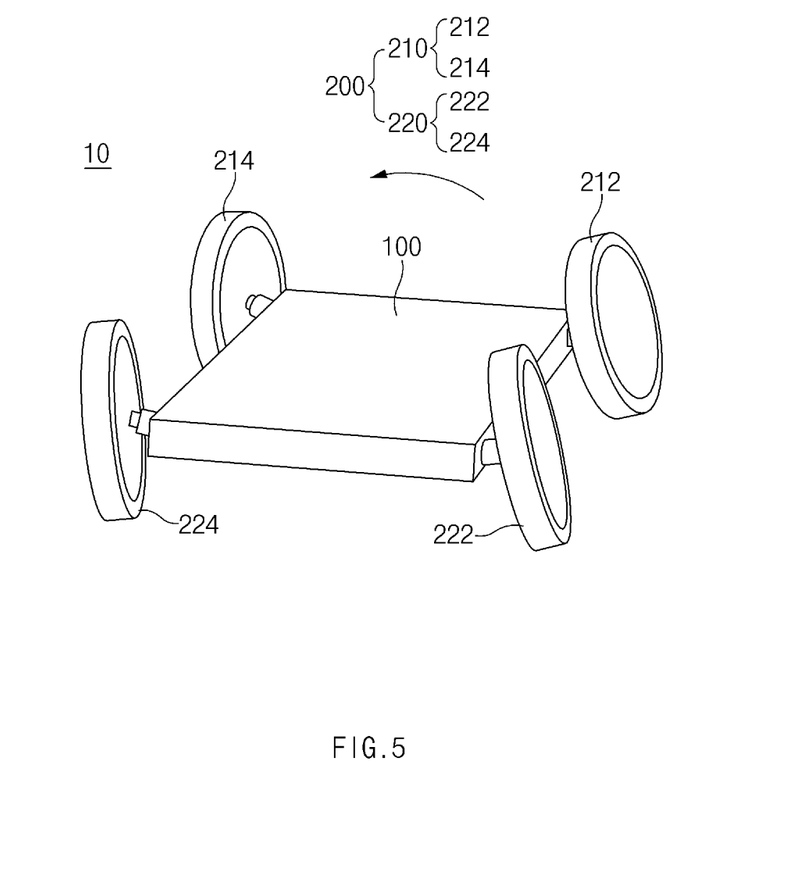
FIG. 5 is a perspective view illustrating a first driving example of a movable object according to an exemplary embodiment of the present disclosure.
Figure 6:
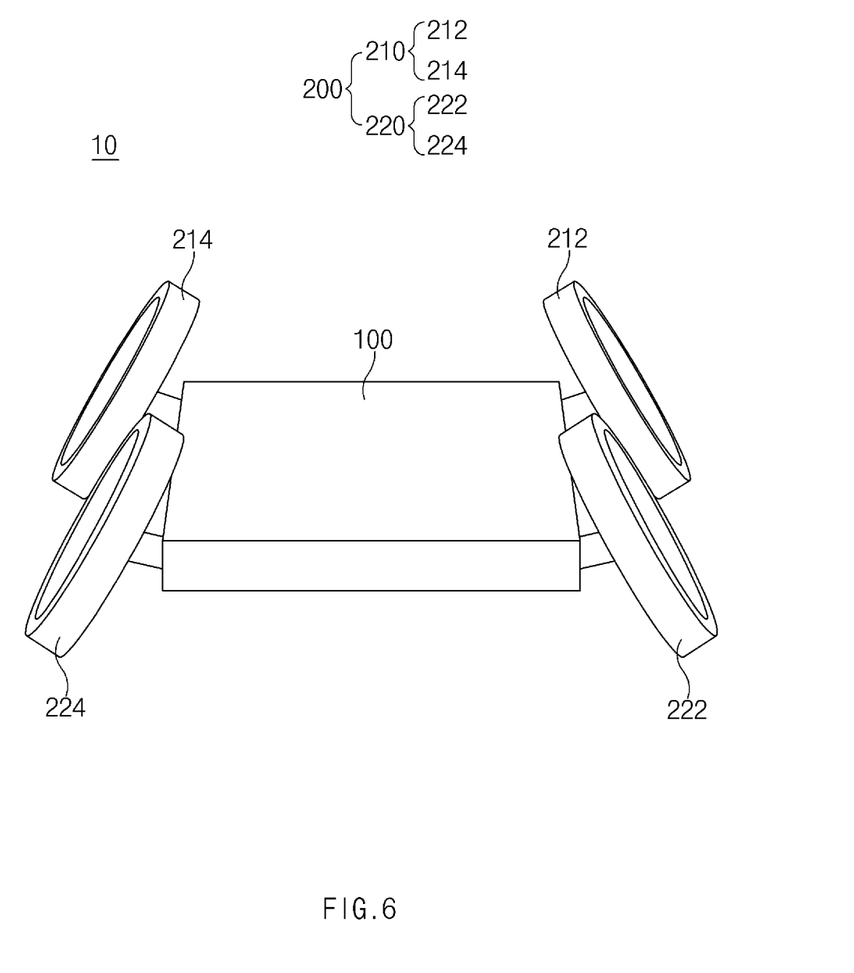
FIG. 6 is a perspective view illustrating a second driving example of a movable object according to an exemplary embodiment of the present disclosure.
Figure 7:
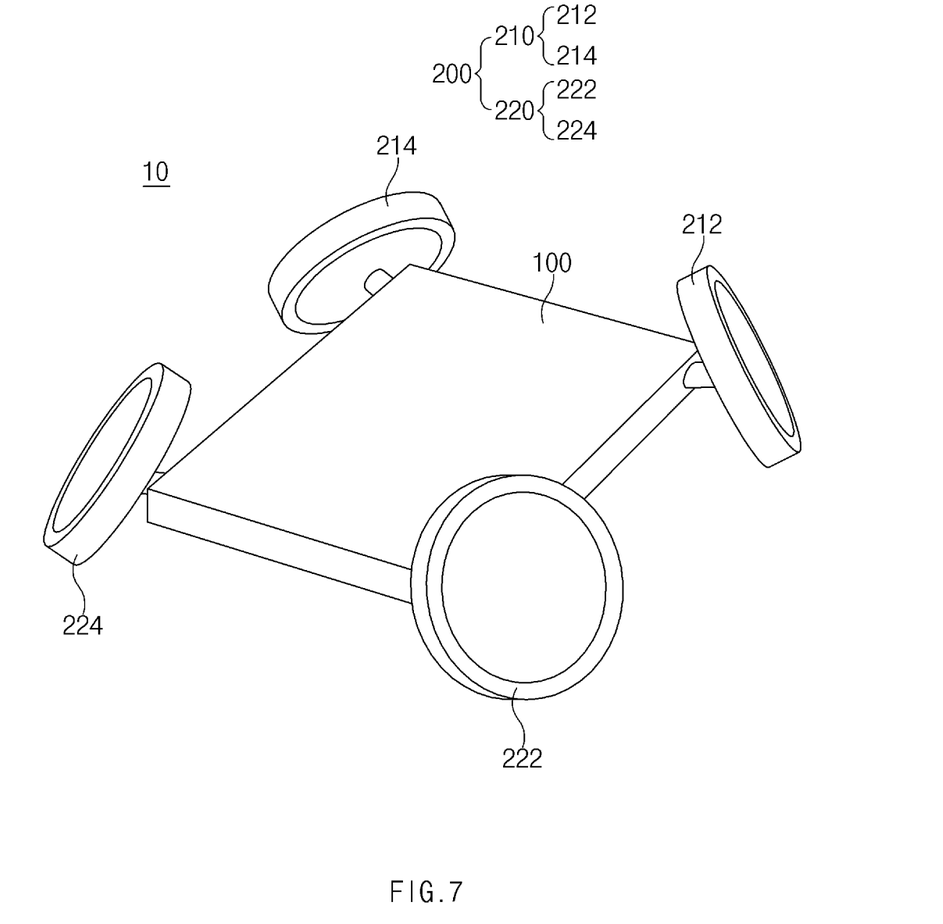
FIG. 7 is a perspective view illustrating a third driving example of a movable object according to an exemplary embodiment of the present disclosure.

FIG. 5 is a perspective view illustrating a first driving example of a movable object according to an exemplary embodiment of the present disclosure, and FIG. 6 is a perspective view illustrating a second driving example of a movable object according to an exemplary embodiment of the present disclosure. FIG. 7 is a perspective view illustrating a third driving example of a movable object according to an exemplary embodiment of the present disclosure.

In the first driving example illustrated in FIG. 5, the movable object 10 may be steered to the left while moving forward. That is, while all of the wheels 200 rotate in the forward direction and the connecting shaft 320 rotates, as illustrated in FIG. 5, when the front portion of the right front wheel 212 is steered close to the body part 100, the front portion of the left front wheel 214 may be steered away from the body part 100. In this case, the movable object 10 may be steered to the left (see an arrow direction in FIG. 5). Here, in order for the movable object 10 to be steered to the left more stably, the connecting shaft 320 may rotate in a manner that allows the upper portion of the right front wheel 212 to be steered close to the body part 100, or allows the upper portion of the left front wheel 214 to be steered away from the body part 100.

Meanwhile, in order for the movable object 10 to be steered to the right, unlike the first driving example illustrated in FIG. 5, while all of the wheels 200 rotate in the forward direction and the connecting shaft 320 rotates, when the front portion of the right front wheel 212 is steered away from the body part 100, the front portion of the left front wheel 214 may be steered close to the body part 100. Here, in order for the movable object 10 to be steered to the right more stably, the connecting shaft 320 may rotate in a manner that allows the upper portion of the right front wheel 212 to be steered away from the body part 100, or allows the upper portion of the left front wheel 214 to be steered close to the body part 100.

Meanwhile, the second driving example illustrated in FIG. 6 relates to a method for preventing the movable object 10 from overturning when the movable object 10 is likely to overturn in the left-right direction due to the uneven ground while moving forward or backward. That is, as illustrated in FIG. 6, when the upper portion of the right front wheel 212 and the upper portion of the left front wheel 214 are steered close to the body part 100, the connecting shaft 320 may rotate in a manner that allows the upper portion of the right rear wheel 222 and the upper portion of the left rear wheel 224 to be steered close to the body part 100. In this case, a distance between the portions of the right wheel 212 and 222 contacting the ground and the portions of the left wheels 214 and 224 contacting the ground may increase, allowing the movable object 10 to move forward or backward in a state in which stability of the movable object 10 in the left-right direction is improved. Thus, even when the ground is uneven, the movable object 10 may be prevented from overturning in the left-right direction.

The third driving example illustrated in FIG. 7 relates to a method for allowing the movable object 10 to rotate in place or to move straight in the left-right direction. That is, as illustrated in FIG. 7, when the upper portion of the right front wheel 212 is steered close to the body part 100 and the front portion of the right front wheel 212 is steered close to the body part 100, the upper portion of the left front wheel 214 may be steered close to the body part 100 and the front portion of the left front wheel 214 may be steered close to the body part 100. In addition, when the upper portion of the right rear wheel 222 is steered close to the body part 100 and the front portion of the right rear wheel 222 is steered away from the body part 100, the upper portion of the left rear wheel 224 may be steered close to the body part 100 and the front portion of the left rear wheel 224 may be steered away from the body part 100.

In this state, when the right front wheel 212 and the right rear wheel 222 rotate in the forward direction, and the left front wheel 214 and the left rear wheel 224 rotate in the reverse direction, the movable object 10 may rotate in place counterclockwise based on FIG. 7. On the contrary, when the right front wheel 212 and the right rear wheel 222 rotate in the reverse direction, and the left front wheel 214 and the left rear wheel 224 rotate in the forward direction, the movable object 10 may rotate in place clockwise based on FIG. 7.

On the other hand, in a state in which the upper and front portions of the wheels 200 are steered as illustrated in FIG. 7, when the right front wheel 212 and the left rear wheel 224 rotate in the forward direction, and the left front wheel 214 and the right rear wheel 222 rotate in the reverse direction, the movable object 10 may move straight in the left direction based on FIG. 7. On the contrary, when the right front wheel 212 and the left rear wheel 224 rotate in the reverse direction, and the left front wheel 214 and the right rear wheel 222 rotate in the forward direction, the movable object 10 may move straight in the right direction based on FIG. 7.

As set forth above, the movable object (or mobile robot) according to exemplary embodiments of the present disclosure may be driven indoors or outdoors with improved stability. In particular, attitude stability of the mobile robot in the direction perpendicular to the driving direction thereof may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A movable object, comprising:
a body part forming a main body;
at least one wheel provided on at least one of left or right sides of the body part; and
an attitude control motor including a connecting shaft having a first end connected to the body part and a second end connected to the at least one wheel, and extending from the first end toward the second end in a longitudinal direction thereof,
wherein the attitude control motor further includes a driving force providing unit that provides a driving force to the connecting shaft to allow the at least one wheel to be steered by rotation of the connecting shaft,
wherein the connecting shaft and the at least one wheel are fixedly connected, and
wherein the second end of the connecting shaft is located higher or lower than the first end of the connecting shaft.

2. The movable object according to claim 1, wherein the second end of the connecting shaft is located in front of or behind the first end of the connecting shaft.

3. The movable object according to claim 2, wherein the at least one wheel includes a front wheel provided on a front area of the body part, and
the second end of the connecting shaft connected to the front wheel is located in front of the first end of the connecting shaft.

4. The movable object according to claim 3, wherein the at est one wheel includes a rear wheel provided on a rear area of the body part, and
the second end of the connecting shaft connected to the rear wheel is located behind the first end of the connecting shaft.

5. The movable object according to claim 4, wherein the front wheel includes a right front wheel provided on the right side of the front area of the body part and a left front wheel provided on the left side of the front area of the body part, and
the rear wheel includes a right rear wheel provided on the right side of the rear area of the body part and a left rear wheel provided on the left side of the rear area of the body part.

6. The movable object according to claim 5, wherein the attitude control motor drives the connecting shaft to rotate in a manner that allows a front portion of the left front wheel to be steered away from the body part when a front portion of the right front wheel is steered close to the body part, and
the attitude control motor drives the connecting shaft to rotate in a manner that allows the front portion of the left front wheel to be steered close to the body part when the front portion of the right front wheel is steered away from the body part.

7. The movable object according to claim 5, wherein the attitude control motor drives the connecting shaft to rotate in a manner that allows an upper portion of the left front wheel and an upper portion of the left rear wheel to be steered close to the body part when an upper portion of the right front wheel and an upper portion of the right rear wheel are steered close to the body part.

8. The movable object according to claim 5, wherein the attitude control motor drives the connecting shaft to rotate in a manner that allows an upper portion of the left front wheel to be steered close to the body part and allows a front portion of the left front wheel to be steered close to the body part when an upper portion of the right front wheel is steered close to the body part and a front portion of the right front wheel is steered close to the body part.

9. The movable object according to claim 8, wherein the attitude control motor drives the connecting shaft to rotate in a manner that allows an upper portion of the left rear wheel to be steered close to the body part and allows a front portion of the left rear wheel to be steered away from the body part when an upper portion of the right rear wheel is steered close to the body part and a front portion of the right rear wheel is steered away from the body part.

10. The movable object according to claim 9, wherein the in-wheel motor drives the left front wheel and the left rear wheel to rotate in a reverse direction when the right front wheel and the right rear wheel rotate in a forward direction.

11. The movable object according to claim 9, wherein the in-wheel motor drives the left front wheel and the right rear wheel to rotate in a reverse direction when the right front wheel and the left rear wheel rotate in a forward direction.

12. The movable object according to claim 9, wherein the in-wheel motor drives the left front wheel and the right rear wheel to rotate in a forward direction when the right front wheel and the left rear wheel rotate in a reverse direction.

13. The movable object according to claim 2, wherein the attitude control motor steers the at least one wheel by driving the connecting shaft to rotate in a manner that allows a front portion of the at least one wheel to move away from or close to the body part.

14. The movable object according to claim 2, wherein the attitude control motor steers the at least one wheel by driving the connecting shaft to rotate in a manner that allows a front portion and an upper portion of the at least one wheel to move away from or close to the body part.

15. The movable object according to claim 1, wherein the second end of the connecting shaft is located higher than the first end of the connecting shaft.

16. The movable object according to claim 1, wherein the attitude control motor steers the at least one wheel by driving the connecting shaft to rotate in a manner that allows an upper portion of the at least one wheel to move away from or close to the body part.

17. The movable object according to claim 1, wherein the at least one wheel further includes an in-wheel motor providing a rotational force to the at least one wheel to allow the at least one wheel to rotate.

18. The movable object according to claim 17, wherein the at least one wheel comprises a plurality of wheels,
the in-wheel motor and the attitude control motor are provided in each wheel so that a plurality of in-wheel motors and a plurality of attitude control motors correspond to the plurality of wheels, respectively, and
the plurality of in-wheel motors and the plurality of attitude control motors are driven independently of each other.

* * * * *